Patented Aug. 18, 1931

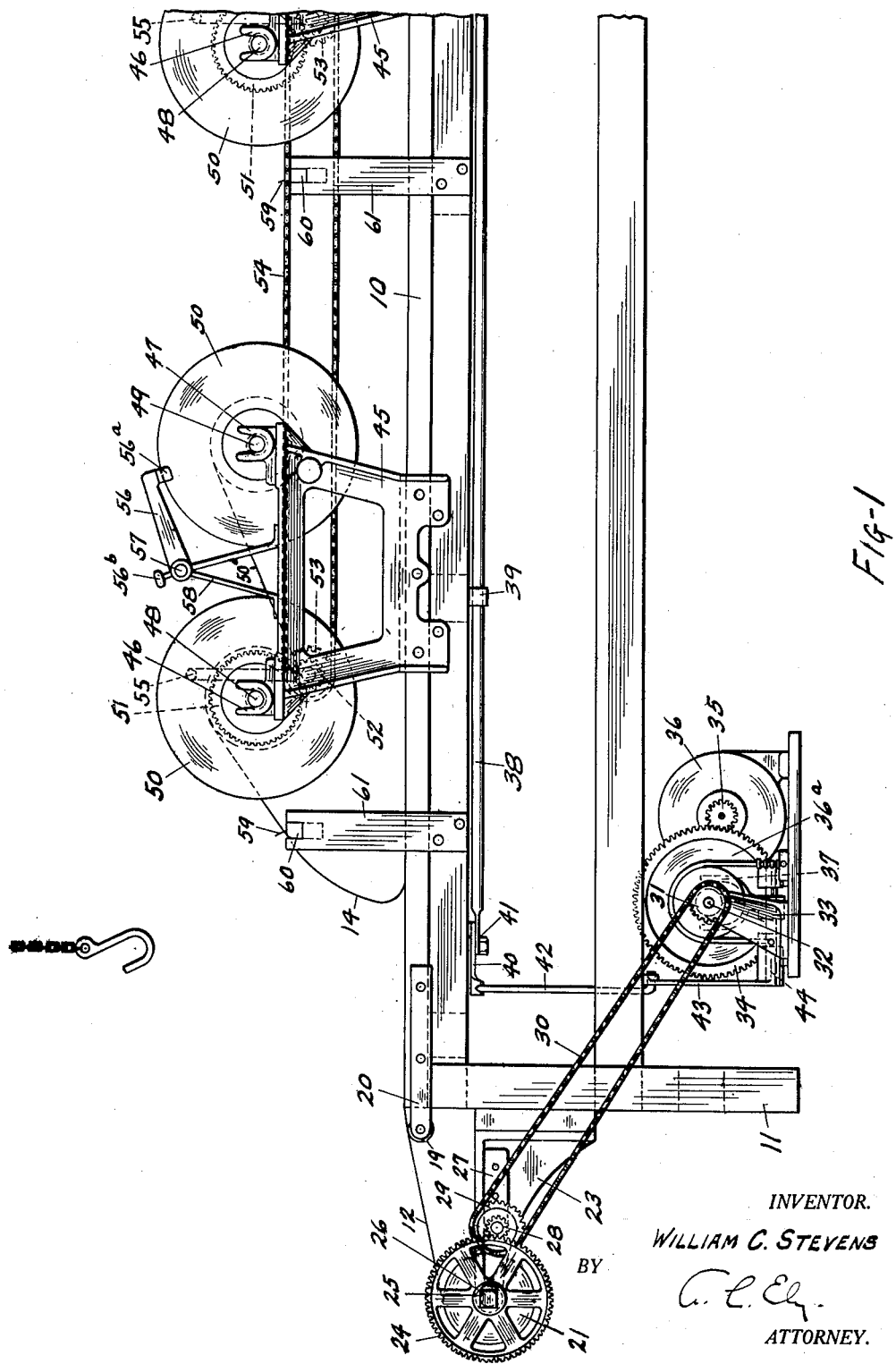

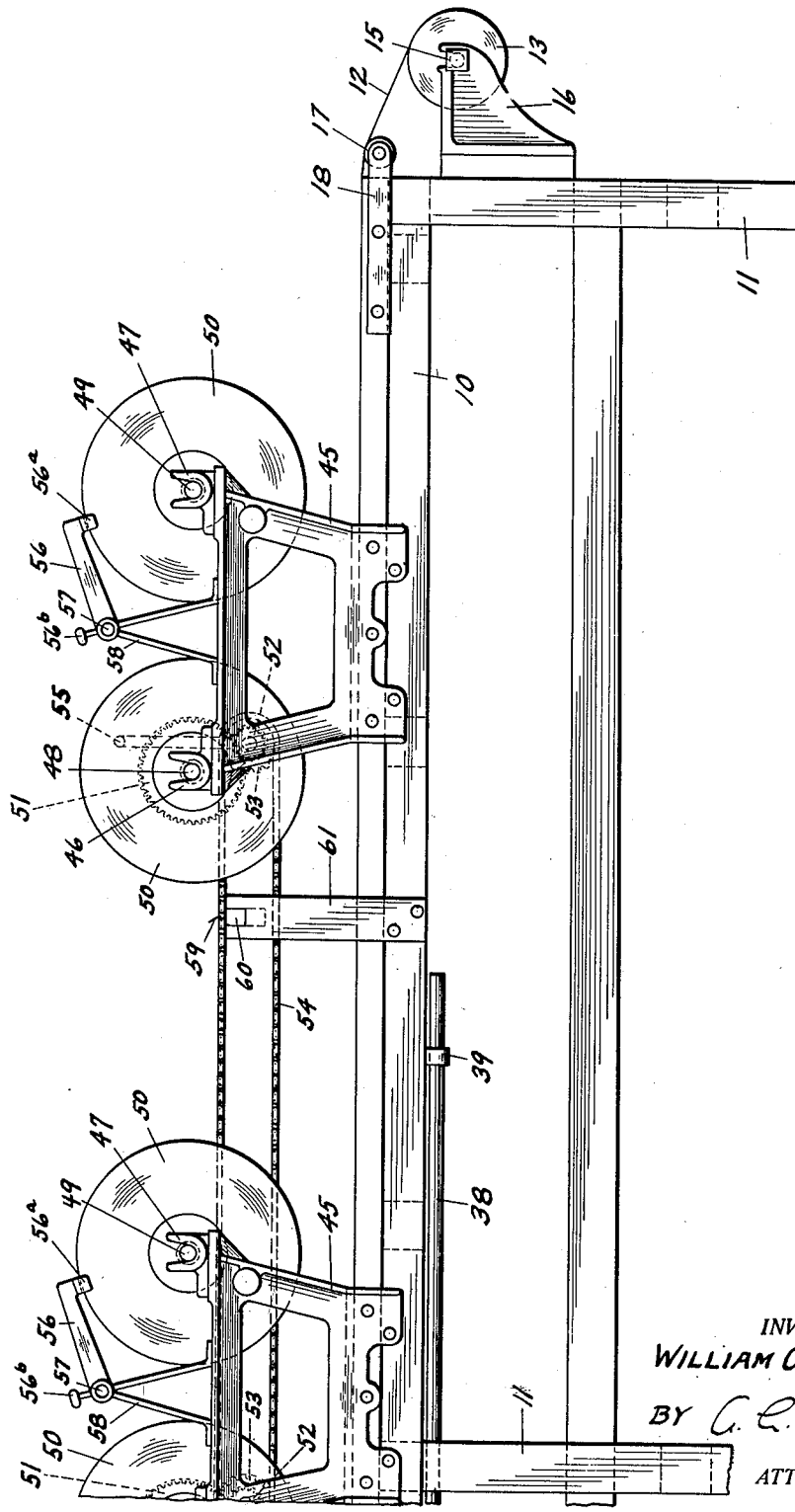

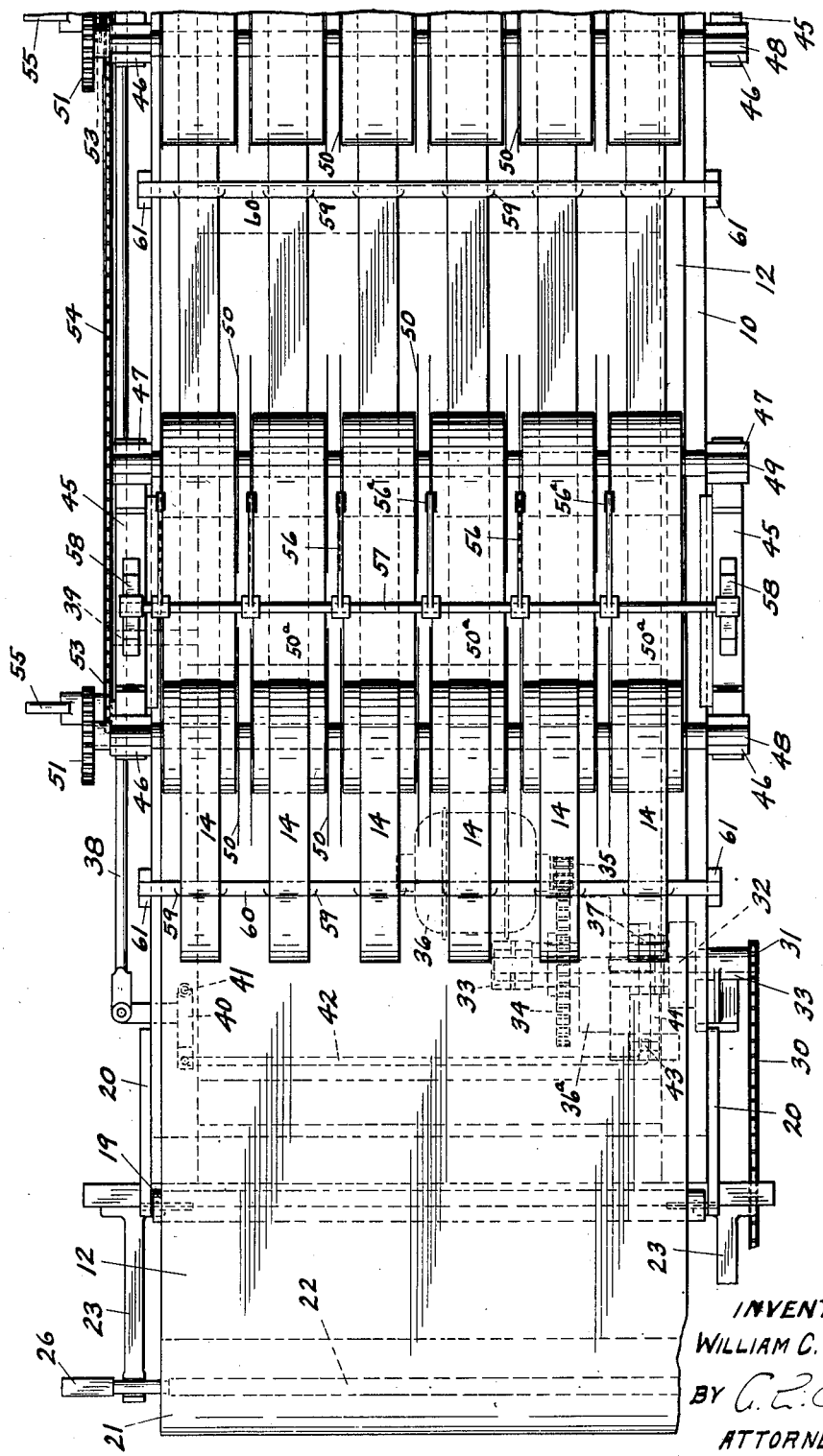

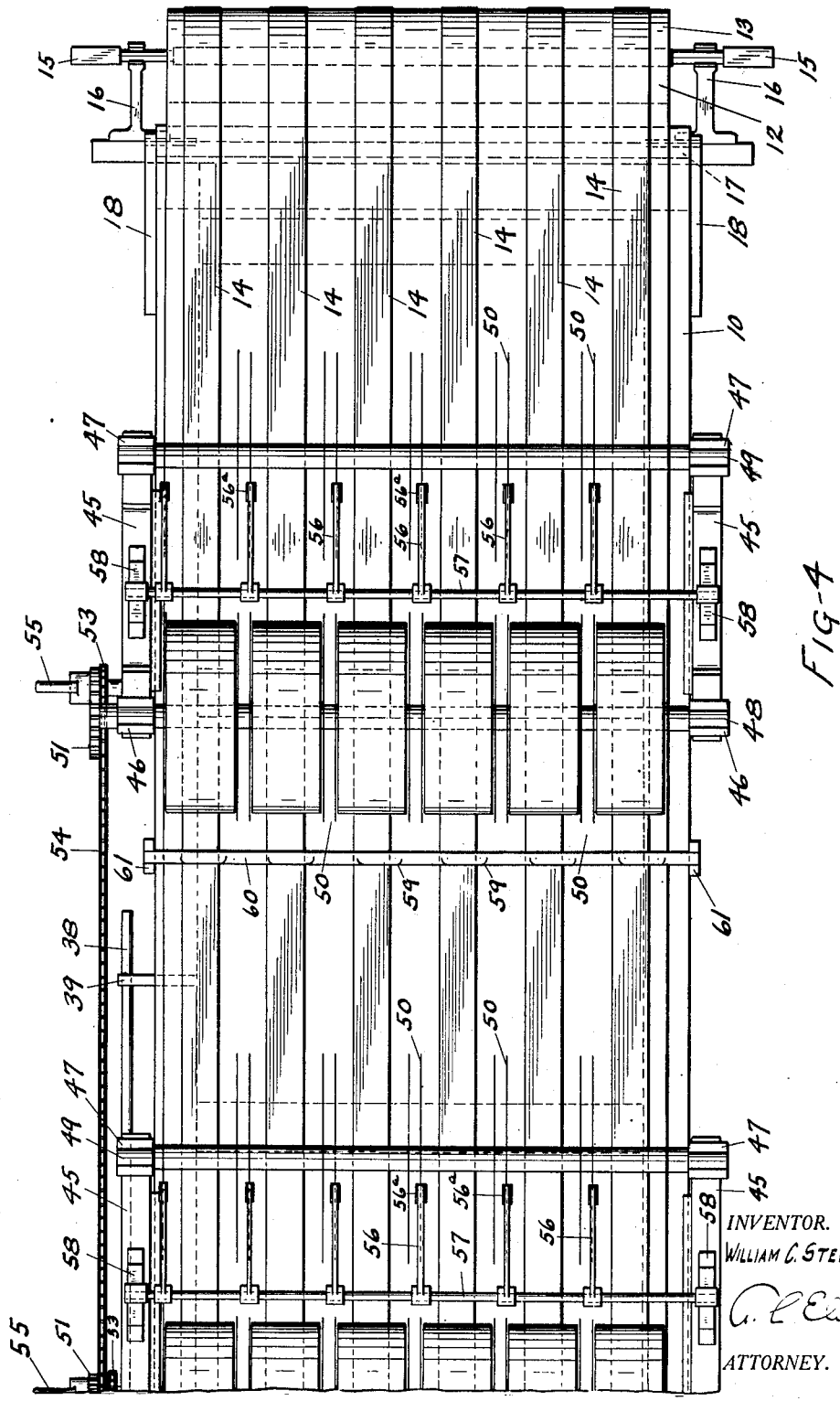

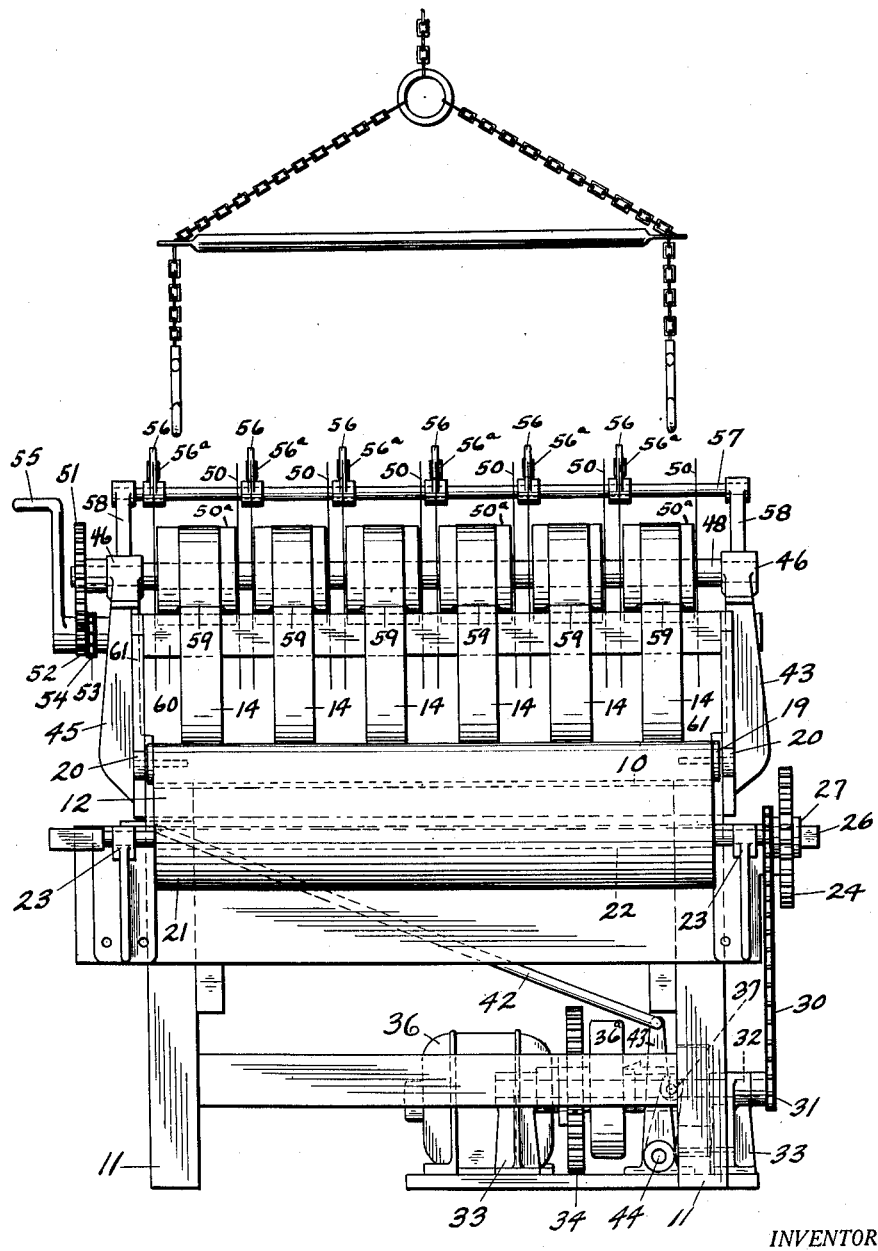

1,819,989

UNITED STATES PATENT OFFICE

WILLIAM C. STEVENS, OF AKRON, OHIO, ASSIGNOR TO THE FIRESTONE TIRE AND RUBBER COMPANY, OF AKRON, OHIO, A CORPORATION OF OHIO

WINDING AND REELING DEVICE

Application filed February 9, 1925. Serial No. 7,789.

This invention relates to reeling devices and especially to devices for reeling tacky sheet material such as rubber or rubberized fabric.

In the preparation of rubber for use as stock in the side walls of tires, after the stock has been compounded, milled and aged, it is calendered into continuous strips of the gauge and width desired in the side wall of the finished tire. Usually, due to the great width of the calender rolls, several strips are calendered at one time, the strips being continuously cut from the calenders by knives placed against the rubber-carrying rolls thereof and being continuously laid upon a liner on which it is reeled so as to prevent sticking of the convolutions of rubber together.

According to modern shop practices, the side wall stock is subsequently assembled with a strip of rubberized fabric known as the bead chafer strip and arranged to extend from the inner edges of the side walls in the tire about the beads, the assembled or composite strip being subsequently applied to the tire.

In order to facilitate the assembly of the strips, it is desirable and in modern practice frequently necessary to furnish the strips of side wall stock to the assemblers on separate reels. The separate reels are then adapted to be distributed to the various assemblers or to assembling devices such as disclosed and claimed in the present applicant's co-pending case Serial No. 756,540, filed December 17, 1924.

The chief object of the present invention is to provide an improved winding and reeling device adapted for the easy rapid and inexpensive transferring of the several strips of side wall stock lying on a single liner wrapped on a reel as it comes from the calenders to separate reels for each strip on which a separate liner is adapted to be interwound with each strip.

A particular object of the invention is to provide a support for carrying the liner on which lie the several strips of stock and to provide several reels, one for each strip mounted so as to receive the stock from said support.

Another object is to provide reels carrying liners adapted to be withdrawn therefrom and wrapped or interwound onto the several reels mentioned above with the strips of side wall stock.

Another object is to provide means for drawing the wide liner over the support and means for rotating the several stock receiving reels.

Another object is to provide a single spindle or support for the several reels from which they are readily removable and means for keeping the reels separate on the spindle during the reeling operation.

Another object is to provide a plurality of sets of reels arranged for cooperation with a single support so that as one set is being used for a reeling operation another set of filled reels can be removed and replaced by empty ones.

The foregoing and other objects are obtained by the construction illustrated in the accompanying drawings and described below. It is to be understood, however, that the invention is not limited to the specific form thereof shown and described.

Of the accompanying drawings:

Figures 1 and 2 taken together illustrate a complete side elevation of a device embodying the invention;

Figures 3 and 4 taken together illustrate a complete plan thereof; and

Figure 5 is an end view thereof.

Referring to the drawings, 10 is a suitable support preferably a table having legs, 11, 11 and adapted to have passed thereover a liner indicated at 12 drawn from a reel thereof shown at 13 on which has been applied by a calender (not shown) several strips of rubber stock shown at 14, 14, which are to be wound on separate reels by the device of the invention.

The reel 13 has a square aperture therein whereby it may be mounted on a square shaft 15, journaled in bearings in suitable brackets 16, 16 mounted on one end of table 10. A roller 17 is provided adjacent reel 13, the roller being removably journaled in brackets 18, 18 secured on table 10 and positioning the roller 17 adjacent one end of the table to guide the liner 12 from the reel 13 onto the table 10. A corresponding roller 19 is mounted adjacent the other end of table 10 on brackets 20, 20 and is arranged to guide the liner 12 off the table 10 onto a reel 21 mounted on a square shaft 22 removably journaled in bearings in brackets 23, 23.

Reel 21 is arranged to be driven to draw liner 12 over table 10. For this purpose a gear 24 formed with a squared aperture 25 is arranged readily to slip onto or from a squared shaft 26 which is adapted to removably receive the reel 21 in a similar manner to the reel 13 on shaft 15. Shaft 26 is removably journaled on brackets 27, 27 and is arranged to be driven by a pinion 28 meshing with gear 24 and connected to a sprocket 29 journaled on one bracket 27. Sprocket 29 has trained thereover a chain 30 which is driven by a spocket 31 on a shaft 32. Shaft 32 is journaled in bearing brackets 33, 33 below table 10 and has a gear 34 loosely journaled thereon and adapted to be freely driven continuously thereon by a pinion 35 on the rotor shaft of a motor 36. For driving shaft 32 by gear 34 the latter is adapted to be clutched onto the shaft 32 by a suitable clutch indicated at 36ª and operable by a yoke 37 adapted to be controlled by an operator from any position along table 10 by a rod 38 extending past the several stock reeling stations on the table and reciprocable in bearings 39, 39 secured on the table. Rod 38 is connected to one arm of a bell-crank lever 40 pivoted at 41 on the under surface of table 10, to the other arm of which is connected a link 42 for connecting lever 40 to an arm 43 secured on a rock shaft 44 onto which yoke 37 is secured.

Any suitable number of stock-reeling stations may be provided along table 10. In the illustration, three are shown at each of which the reels are mounted on brackets 45, 45 formed with open bearings 46, 46 and 47, 47 for respectively receiving shafts 48 and 49. Reels 50 are adapted to be slidably but non-rotatably received on shafts 48 and 49, the reels 50 on the former being empty for receiving the stock and a liner, and reels 50 on the latter having a liner wrapped thereon. Shafts 48 are adapted to be driven by gears 51 thereon with which mesh pinions 52 driven by sprockets 53. Sprockets 53 have trained thereover a common drive chain 54 and each has connected thereto a crank 55 whereby the reels at all stations may be driven from any one station. In order to maintain the reels in separated positions on shafts 48 and 49, reel positioning arms 56, 56 are adjustably secured by thumb screws 56ᵇ, 56ᵇ on transverse rods 57, 57 mounted on brackets 58, 58. Arms 56 are each formed with bifurcated fingers 56ª embracing one flange of each reel 50 on shafts 49 to maintain them in their proper positions thereon, the reels 50 on shaft 48 being retained in position thereon by the liners passing thereon from the reels 50 on shaft 49.

The removal of tacky stock from a liner is best accomplished by pulling the stock substantially at an angle of 90° or less to its original plane when on the liner. Accordingly the stock-receiving reels 50 are arranged to receive the stock through guides 59, 59 comprising wire loops mounted in forwardly inclined positions on a transverse bearing 60 supported by struts 61, 61 so that the strips 14 pass under each guide device after passing the adjacent cooperating set of reels and then backwardly through the loops 59 onto reels 50.

The operation of the device, which will be apparent from the foregoing, may be briefly summarized as follows:

A reel carrying a liner and strips of stock interwound thereon as it is furnished by the calenders is mounted on squared shaft 15 which is then mounted on brackets 16. The free end of the liner, indicated at 12, is drawn over table 10 under the several sets of reels 50 and onto reel 21. The liner 12 carries the strips of stock over the table. The leading ends of the strips 14 are then separated from the liner 12 and are trained through the guides 59 adjacent the left end of the device. Empty reels 50 are mounted on shafts 48 and reels carrying liners on shafts 49, and the free ends of the strips 14 are interwound on the empty reels 50 together with the free ends of liner strips indicated at 50ª coming from the liner-carrying reels 50.

Rod 38 is now reciprocated to effect engagement of clutch 36 whereupon liner 12 will be drawn across table 10 onto reel 21. At the same time the operative operates the hand-crank 55 thus rotating the empty reels 50, the speed of their rotation, being governed so as to draw strips 14 onto the reels 50 through guides 49 in the manner illustrated in Figure 1. Rotation of any hand-crank 55 will drive the strip receiving reels of all sets, so that, in certain cases, or when desired, strips may be simultaneously removed from liner 12 at different reeling stations. Rotation of the originally empty reels 50 will effect a removal of strips 14 from liner 12 and also will interwind these strips on the stock-receiving reels 50 together with the liners 50ª which will be simultaneously unwrapped from the liner-carrying reels 50.

According to the usual mode of operating the device, since the liner 12 carries strips of such length that each strip 14 will fill several reels 50, after the first set of reels are filled the strips 14 are cut and the cut ends are led through another set of guide devices 59 onto another set of empty reels 50 at another reeling station. Rotation of reels 50 at the second station will effect the above-described reeling operations and may at the same time complete the reeling operations of the first station.

which consists in drawing onto the first set of reels the ends of the strips 14 to be wrapped thereon and also the remainder of the liners 50ᵃ which are usually provided so that several outer layers thereof will be wound onto reels 50 after strips 14 have been completely wound thereon.

While a reeling operation is taking place on the second set of reels 50, the reels 50 containing strips 14 and liners 50ᵃ are removed from shaft 48 and carried to the next point of operation in the factory such as to the sidewall and chafer assembling machines. Reels containing the liner only are carried back from the assembling machines and the empty reels 50 on shaft 49 are removed therefrom and placed on shaft 48, the reels carrying the liner being mounted on shaft 49, and the first set of reels is then ready for another reeling operation. Thus while one set of reels are performing the reeling operation, another set may be removed and replaced.

Reeling of strips 14 onto the various sets of reels 50 will proceed as described until all of the strips 14 on liner 12 have been reeled onto reels 50. Then the rest of liner 12 which is, of course, longer than the strips 14, is drawn onto reel 21, which is subsequently removed from shaft 26, the clutch 36 being disengaged and gear 24 being removed from shaft 26 to permit withdrawal of the shaft 26 from brackets 27. Reel 21 containing the liner 12 is transported to the calender room to receive more strips 14 thereon from the calenders and another reel 13 of liner 12 carrying strips 14 is transported to and mounted onto shaft 15, to replace the empty reel 13 which is removed and mounted on shaft 26 and thus functions subsequently as reel 21. Gear 24 is now replaced on shaft 26 and the operations as described above are repeated.

Modifications of the invention may be resorted to without departing from the spirit thereof or the scope of the appended claim.

What is claimed is:

Winding and reeling apparatus comprising a traveling carrier for a plurality of strips of tacky stock, a plurality of reels mounted over the carrier for separately reeling the strips and a plurality of reels adjacent the first reels and carrying liners to be interwound with said strips on said first reels, the first and second set of reels respectively, being mounted on common shafts, and means for holding said second set of reels in spaced positions on said shaft, said means including arms engaged with said reels and adjustably mounted on a common transverse rod.

WILLIAM C. STEVENS.